(12) United States Patent
Ansari et al.

(10) Patent No.: US 8,774,143 B2
(45) Date of Patent: Jul. 8, 2014

(54) SYSTEM AND METHOD OF COMMUNICATION USING A SMART METER

(75) Inventors: Adil Ansari, Kennesaw, GA (US);
Richard Dale Slates, Minden, NV (US);
Rahul Jaikaran Chillar, Marietta, GA (US); Kenneth James Caird, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 12/948,973

(22) Filed: Nov. 18, 2010

(65) Prior Publication Data

US 2012/0131324 A1 May 24, 2012

(51) Int. Cl.
*H04W 4/00* (2009.01)
*H04L 12/28* (2006.01)
*G06F 15/173* (2006.01)
*G08B 23/00* (2006.01)
*G01R 21/00* (2006.01)

(52) U.S. Cl.
USPC ........ 370/338; 370/401; 455/435.1; 709/223; 340/870.02; 702/61

(58) Field of Classification Search
CPC ..... H04W 84/02; H04W 84/04; H04W 84/18; H04W 88/06; H04W 74/08; H04M 3/5116; H04M 2242/30; G06F 9/542; G06F 11/3495
USPC .......... 370/400, 338, 401; 709/223; 713/100; 455/435.1; 340/870.02; 702/61
See application file for complete search history.

(56) References Cited

U.S. PATENT DOCUMENTS

| | | | |
|---|---|---|---|
| 6,198,408 B1 | 3/2001 | Cohen | |
| 6,784,806 B1 | 8/2004 | Lee, Jr. et al. | |
| 6,813,571 B2 | 11/2004 | Lightbody et al. | |
| 7,487,282 B2 | 2/2009 | Leach | |

(Continued)

FOREIGN PATENT DOCUMENTS

EP        2199990 A1     6/2010

OTHER PUBLICATIONS

Office Action issued in connection with NZ 506475, Nov. 23, 2011.

(Continued)

*Primary Examiner* — Alpus H Hsu
*Assistant Examiner* — Anthony Luo
(74) *Attorney, Agent, or Firm* — Fletcher Yoder, P.C.

(57) ABSTRACT

Described herein are embodiments of methods and systems of communicating with smart appliances through a smart grid and smart meter infrastructure. In one aspect, a method is described comprising a smart meter connected to a first network receiving via the first network registration information for an appliance operably connected to the first network, wherein the registration information includes a unique identifier for the appliance; transmitting at least a portion of the registration information and a smart meter identifier that uniquely identifies the smart meter to a second computing device connected to a second network; receiving, by the second computing device, update information for the appliance; transmitting, by the second computing device, the update information to the smart meter via the second network using the unique identifier for the device and the smart meter identifier; transmitting, by the smart meter, the update information to the appliance; and updating the appliance with the update information.

11 Claims, 8 Drawing Sheets

(56) References Cited

U.S. PATENT DOCUMENTS

| | | | |
|---|---|---|---|
| 7,693,670 B2 | 4/2010 | Durling | |
| 8,099,195 B2* | 1/2012 | Imes et al. | 700/278 |
| 2005/0240540 A1 | 10/2005 | Borleske et al. | |
| 2006/0224711 A1* | 10/2006 | Engel et al. | 709/223 |
| 2009/0040057 A1 | 2/2009 | Keyghobad et al. | |
| 2009/0135836 A1* | 5/2009 | Veillette | 370/400 |
| 2010/0017781 A1 | 1/2010 | Schwarz et al. | |
| 2010/0248690 A1* | 9/2010 | Biggs et al. | 455/411 |
| 2010/0278533 A1* | 11/2010 | Julien et al. | 398/58 |
| 2010/0287271 A1* | 11/2010 | Tabbara et al. | 709/223 |
| 2011/0086619 A1* | 4/2011 | George et al. | 455/414.1 |
| 2011/0202293 A1* | 8/2011 | Kobraei et al. | 702/62 |

OTHER PUBLICATIONS

European search report issued in connection with EP patent application No. 11188868.1, Sep. 6, 2013.

* cited by examiner

| Unique Meter Identifier | Unique Device/ Appliance Identifier | Unique Device/ Appliance Identifier | Unique Device/ Appliance Identifier | Unique Device/ Appliance Identifier |
|---|---|---|---|---|
| 123456 | 123456-1 | 123456-2 | ... | 123456-n |
| ABC123 | ABC123-A | ABC123-B | ... | ABC123-n |
| 1785992B | 6723546 | 02873RGV | P082743BC | ... |
| 1111111 | 222222 | ... | ... | ... |
| ... | ... | ... | ... | ... |

FIG. 3

SYSTEM AND METHOD OF COMMUNICATION USING A SMART METER

BACKGROUND OF THE INVENTION

The increasing demand for energy and the use of finite resources for energy production have led to the use of increased technology for the production, transmission, distribution and consumption of energy in order to make, distribute and use energy more efficiently and wisely. To that end, utility service providers have begun employing information technology systems integrated with their energy production, transmission, distribution and metering systems to enable more efficient monitoring and operation of such systems. Concurrently, vendors and manufacturers have also begun employing similar technology in products and devices that consume electricity, such as appliances (e.g., refrigerators, washing machines and dryers, dishwashers, HVAC systems, lighting systems, stoves, water heaters, etc.) and electronics (e.g., televisions, stereos, computers, etc.). These efforts are often broadly categorized as smart grid, smart meter and smart appliance technologies.

The smart grid marries information technology with the current electrical infrastructure. The smart grid is, in essence, an "energy Internet," delivering real-time energy information and knowledge—empowering smarter energy choices. Roles for the smart grid include enabling the integration and optimization of more renewable energy (such as wind and solar); driving significant increases in the efficiency of the electrical network; and, empowering consumers to manage their energy usage and save money without compromising their lifestyle.

Smart grid technologies provide utilities and consumers with real-time knowledge and decision-making tools that empowers them to save energy, resources, money, and the environment. The smart grid is not a singular product, but rather a collection of hardware and software that works together to make today's electrical grid more intelligent. Similar to how the Internet turned a disaggregated collection of computers into a more powerful tool, overlaying the current power infrastructure with smart grid technology is like connecting the Internet to the computer, making an already useful machine much better and providing people with information to make intelligent decisions. Similarly, the smart grid, or the "energy Internet," empowers consumers, businesses and utilities to make smarter energy choices.

Smart grid components include automation software and intelligent electronic hardware systems that control the transmission and distribution grids. Smart grid automation technologies—such as energy management systems and distribution management systems—help provide real-time knowledge and control over the distribution and transmission grids. On the transmission side, Energy Management Systems (EMS) provide real-time information on the grid's status, helping utilities automate various grid functionalities remotely. This automation technology helps utilities choose the best, most affordable generation mix (known as economic dispatch), keeping costs lower for consumers and businesses; reduce losses and waste in the delivery of power to drive a more efficient system; and maintain system reliability to help ensure a steady supply of power to customers. Distribution Management System (DMS) comprises the smart grid automation technology that provides utilities with real-time information about the distribution network and allows utilities to remotely control switches in the grid. The DMS is the heart of a smarter distribution grid; enabling utilities to manage distributed renewable generation, support grid efficiency technologies, and control the isolation and restoration of outages. Without DMS, the utility gets very little real-time information about the distribution grid and can't realize many of the benefits of a smarter grid.

Furthermore, smart grid technologies can extend beyond the electrical grid. With smart grid technologies in the home—like smart meters, smart energy panels, and smart appliances—consumers can have access to more accurate data and knowledge about electricity pricing, helping them save money and lower their environmental footprint.

Currently, most power companies offer one set price for electricity throughout the day, regardless of how expensive it is to produce. Most consumers don't know that it costs much more to produce energy during the peak hours of the day—typically between 2 p.m. and 7 p.m.—than it does at any other time. A smart meter can communicate time of use pricing via smart home energy panels or other display devices to help consumers make smarter energy choices throughout the day. Consumers will be more likely to use high-consuming devices during off-peak pricing periods, when electricity prices are cheaper. With smart meters, buying electricity is like buying other consumer goods—with price impacting purchase decision. For example, a consumer can choose to have their house pre-cooled before arriving home to ensure the air conditioning system can remain off during expensive peak pricing hours, without impacting the consumer's comfort level. A consumer can also have their water pre-heated to avoid peak prices and lower their energy bill. A year-long study by the U.S. Department of Energy showed that real-time pricing information provided by the smart meter helped consumers reduce their electricity costs 10% on average and their peak consumption by 15%.

Smart meters can also enable consumers to pre-pay their electricity bill and help utilities better detect and manage outages. Smart meters coupled with advanced metering infrastructure (AMI) helps pinpoint problems on the grid, allowing utilities to determine exactly which customers are without power. Compare this to today, when many utilities still wait for customer calls to notify them of outages.

Smart appliances can work in concert with smart meters and the smart grid to avoid peak-hour energy use and top-tier pricing—without any negative impact on the consumer—by adapting to price signals from the utility. For example, a dryer may automatically switch from high heat to "fluff" if electricity hits a certain per-kilowatt-hour rate—even if the homeowner is at work. Or, the automatic defrost on a refrigerator can delay itself until a time of reduced electricity rates. If the freezer delays the defrost cycle until after peak energy hours, consumers pay less for the same amount of energy. There are countless ways to conserve energy and save money when smart appliances are coupled with smart meters and time-of-use pricing information including, for example, updating software or firmware of a smart appliances using the smart grid and smart meter infrastructure. The smart grid, smart meter and smart appliance technologies enable utilities to communicate (duplex) with smart appliances in the home. This ability creates opportunities beyond that of energy management.

Therefore, what is desired is a method and system that overcomes challenges in the art, some of which are described above, to provide communication with smart appliances through smart grid and smart meter technology.

BRIEF DESCRIPTION OF THE INVENTION

Described herein are embodiments of methods and systems for communicating with smart appliances using smart grid and smart meter technology. In general, embodiments of the present invention provide an improvement over current methods of appliance diagnostics and updating software, firmware or configuration settings of smart appliances and devices using direct shipment of software or firmware upgrades to the consumer or by requiring direct connection of the appliance or device to the Internet or other communication network.

In accordance with one aspect, a method is provided of communicating with an appliance using a meter. In one embodiment, the method includes: (1) a meter connected to a first network receiving via the first network information for a device operably connected to the first network, wherein the information includes a unique identifier for the device; (2) transmitting at least a portion of the information and a meter identifier that uniquely identifies the meter to a second computing device connected to a second network; (3) receiving, by the second computing device, update information for the device; (4) transmitting, by the second computing device, the update information to the meter via the second network using the unique identifier for the device and the meter identifier; (5) transmitting, by the meter, the update information to the device; and (6) updating the device with the update information.

In accordance with another aspect, a method of communication using a meter is described. One embodiment of the method comprises: (1) receiving via a first network, information for a device operably connected to said first network, wherein the information includes a unique identifier for the device; (2) transmitting, via a second network, at least a portion of the information to a computing device connected to the second network, wherein the information comprises the unique identifier for the device; (3) receiving, via the second network, update information for the device, wherein the update information is transmitted using the unique identifier for the device; and (4) transmitting, via the first network, the update information to the device.

In accordance with yet another aspect, a system is provided for updating a device using a meter. One embodiment of the system is comprised of: (1) a first network; (2) a meter operably connected to the first network, wherein the meter receives via the first network, information for a device operably connected to the first network, the information including a unique identifier for the device; (3) a second network operably connected with the meter; (4) a second computing device operably connected with the second network, wherein the meter transmits via the second network, at least a portion of the information and a meter identifier that uniquely identifies the meter to the second computing device connected to the second network, wherein the second computing device receives update information for the device, wherein the second computing device transmits the update information to the meter via the second network using the unique identifier for the device and the meter identifier, wherein the meter transmits the update information to the device, and wherein the device is updated with the update information.

In accordance with yet another aspect, a method is provided for updating an appliance using a smart meter. One embodiment of the method comprises a smart meter connected to a second network transmitting registration information for an appliance operably connected to the smart meter via a first network and a smart meter identifier that uniquely identifies the smart meter, to a second computing device connected to the second network. The second network is comprised of a plurality of smart meters, each of the plurality of smart meters connected to a respective first network and each respective first network connected to one or more appliances. The second computing device receives the registration information and the smart meter identifier and stores the registration information and smart meter identifier with registration information and smart meter identifiers for the plurality of smart meters and their respective one or more appliances. This forms a plurality of smart meter identifiers each associated with one or more registration information. The second computing device receives update information for at least one of the one or more appliances. The second computing device determines a selected smart meter identifier to receive the update information by comparing the update information to each of the one or more registration information for each smart meter identifier. Once determined, the second computing device transmits the update information to a selected smart meter associated with the selected smart meter identifier. The selected smart meter transfers the update information to the appliance; and the appliance is updated with the update information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 illustrates an exemplary table that can be used to associate a unique meter identifier with one or more unique device/appliance identifiers of appliances that are operably connected with the identified smart meter via the first network;

DETAILED DESCRIPTION OF THE INVENTION

Figure 1:
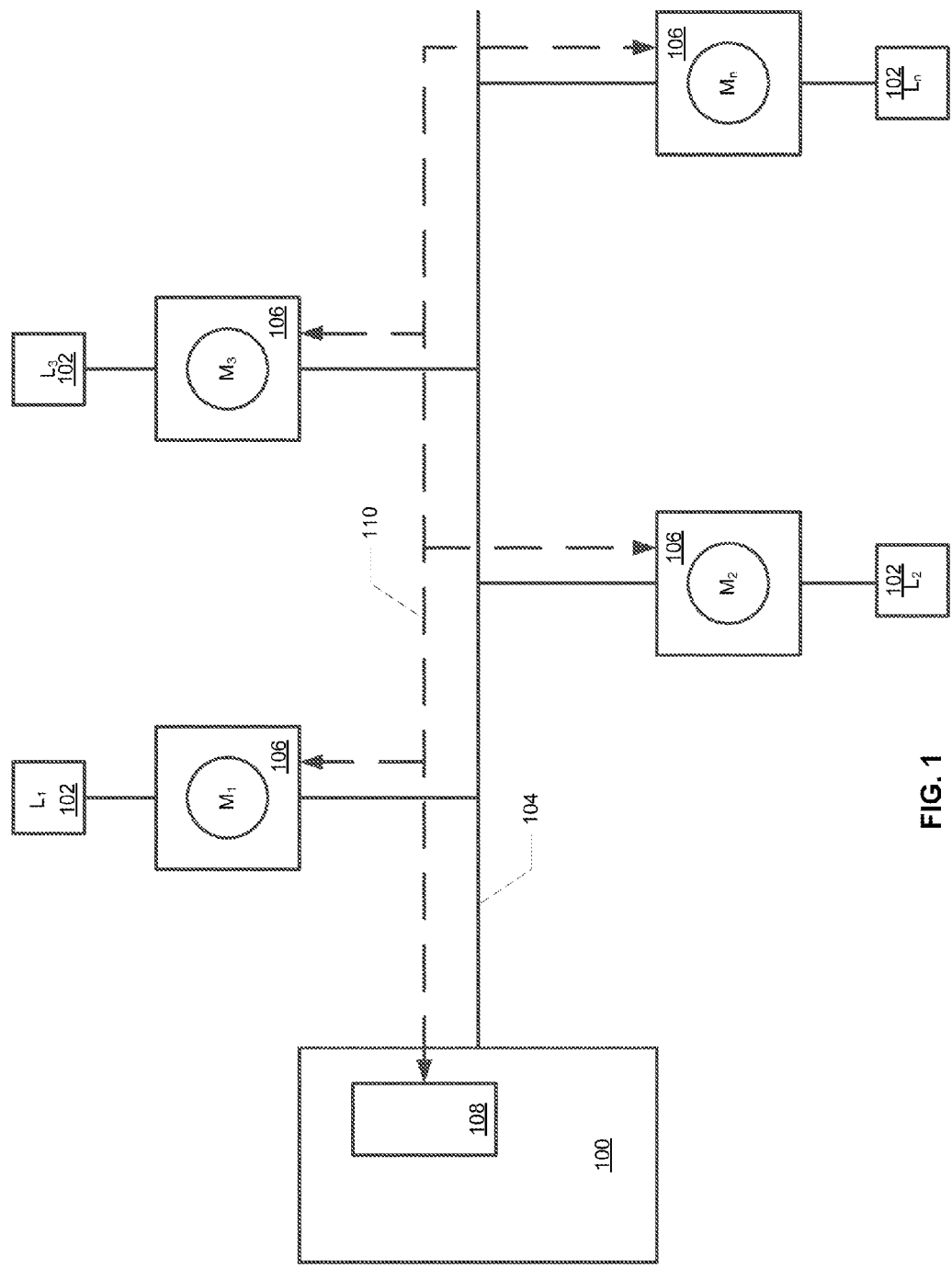
FIG. 1 is a block diagram of a section of an exemplary utility distribution system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Smart appliances are appliances that can be programmed to operate when it is most cost effective to do so based on time-of-use pricing signals from the utility. For example, a smart refrigerator would only enable the defrost cycle to occur when electricity prices are lowest, without compromising a consumer's lifestyle. Smart meters are among the fundamental building blocks of smart grid deployments. They track and report energy usage by time of day, enabling utilities to charge less for electricity used during off-peak hours. As a result, consumers can choose to shift energy-intensive activities to times when rates are lower to save on energy costs. In general, smart appliances can be configured to communicate with a smart meter and smart meters are configured to communicate with the smart grid. Previously, these communication capabilities were used to transfer time of use information and appliance control signals among and between the utility and the smart appliance. However, as described herein, these communication capabilities can be used for additional purposes, including for example updating smart appliance software or firmware using the smart grid and smart meter infrastructure.

Referring to FIG. 1, an illustration of one type of system that would benefit from embodiments of the present invention is provided. FIG. 1 is a block diagram of a section of an exemplary utility distribution system such as, for example, an electric distribution system. As shown in FIG. 1, a utility service is delivered by a utility provider 100 to various loads $L_1$-$L_n$ 102 through a distribution system 104. In one aspect, the utility service provided is electric power. Consumption of the utility service by the loads 102 is measured at the load locations by meters $M_1$-$M_n$ 106. If an electric meter, the meter 106 can be single-phase or poly-phase electric meters, as known to one of ordinary skill in the art, depending upon the load 102. In one aspect, the electric meter 106 is a smart meter as described herein and as known to one of ordinary skill in the art. Hereinafter, the specification will refer to the meter 106 as a "meter," "electric meter," and/or "smart meter," where the terms can be used interchangeably. One non-limiting example of a smart meter is the GE I210+c meter as available from General Electric Company (Schenectady, N.Y.). In one aspect, the meter 106 is configured to communicate via a network with the loads 102. In one aspect, the loads 102 can be smart appliances, as described herein and as known to one of ordinary skill in the art. Smart appliances are available form vendors or manufacturers such as, for example, General Electric Company, Whirlpool Corporation (Benton Harbor, Mich.), LG Electronics USA (Englewood Cliffs, N.J.), among others. While consumption information is used by the utility provider 100 primarily for billing the consumer, it also can be used for other purposes including planning and profiling the utility distribution system. In many instances, meters 106 are still read by hand, which can be costly, inefficient and error-prone. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the meters 106 can be configured to communicate with one or more computing devices 108 through a communications network 110, which can be wired, wireless or a combination of wired and wireless, as known to one of ordinary skill in the art. In one aspect, the communications network can comprise at least part of a smart grid network. Therefore, it is desired that the meters 106 and system such as that shown in FIG. 1 are configured to have capabilities beyond that of mere delivery and measurement of utility services. Described herein are embodiments of methods and systems to communicate with smart appliances using a smart grid and smart meters. In one aspect, smart appliances can be updated with software, firmware or configuration settings using the smart grid, smart meter and smart appliance infrastructure. In another aspect, diagnostic information of a smart appliance can be communicated using the smart grid, smart meter and smart appliance infrastructure. In general, the technical effect of embodiments of the present invention provide an improvement over current methods of updating smart appliance firmware or software by allowing such updates to be performed using a smart grid and smart meter infrastructure and to allow remote diagnostics of a smart appliance to be performed using the smart grid and smart meter infrastructure.

Figure 2:
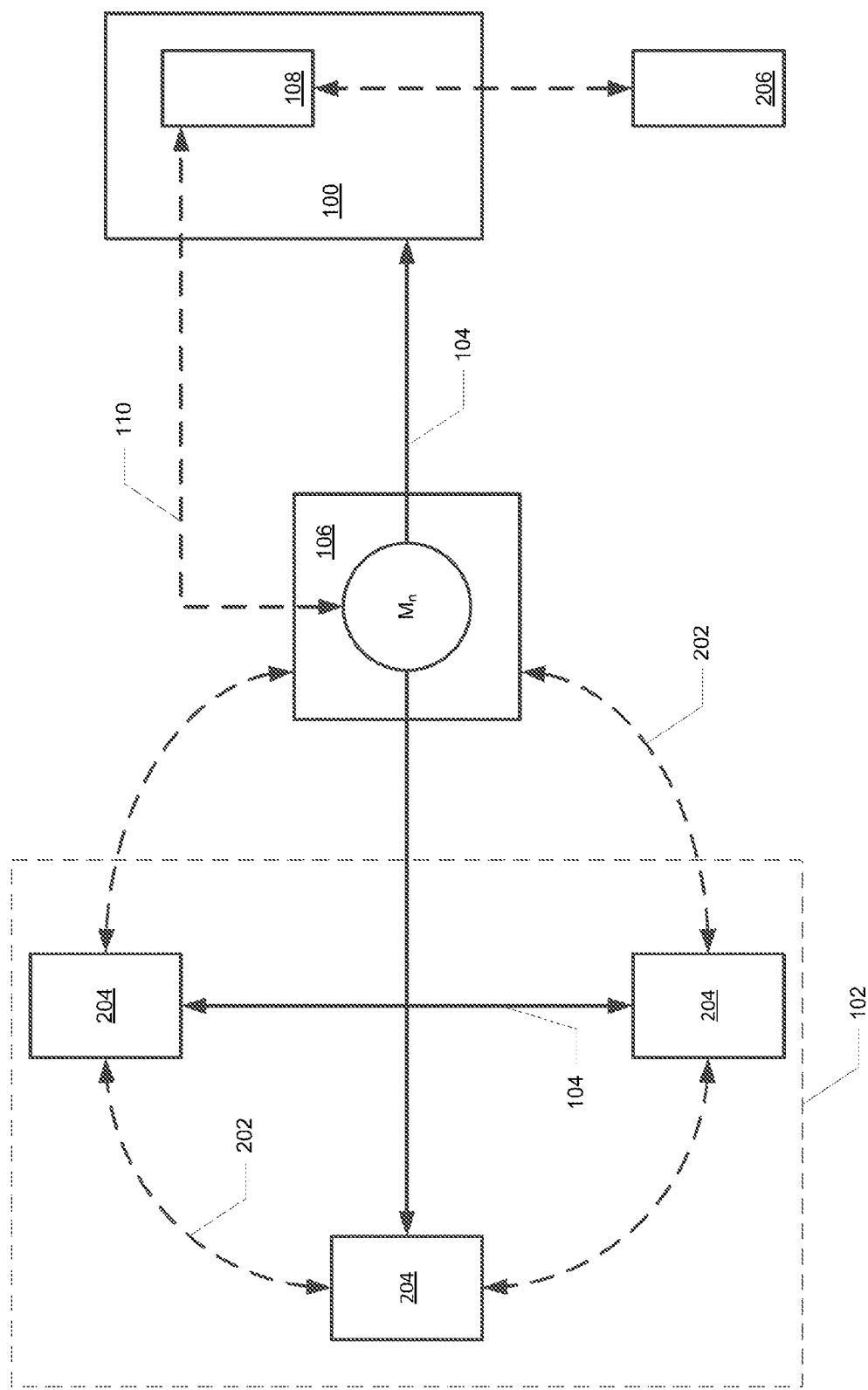
FIG. 2 is an exemplary illustration of a smart meter configured to communicate with one or more smart appliances or devices over a first network and configured to communicate with a second computing device over a second network.

FIG. 2 is an exemplary illustration of a smart meter configured to communicate with one or more appliances or devices over a first network and configured to communicate with a second computing device over a second network. In one aspect, the appliances are smart appliances as described herein and as known to one of ordinary skill in the art. As used herein, the specification will refer to an appliance 204 as an "appliance," a "smart appliance" and/or a "device" where the terms can be used interchangeably. As shown in FIG. 2, a first network 202 is used to communicate between one or more smart appliances 204 or devices and a meter 106. In one aspect, one or more smart appliances 204 comprise at least a portion of a load 102, and can form a network 202 that communicates with the meter 106. The meter 106 also measures consumption of the utility service as provided by the distribution system 104. Furthermore, the meter 106 is configured to communicate over a second network 110. In one aspect, the meter 106 can communicate with at least a second computing device 108 via the second network 110. In one aspect, the meter 106 is operably connected to the first network 202. In one aspect, the meter 106 receives information for an appliance 204 operably connected to the first network 106 via the first network 202. For example, the appliance 204 can be configured to transmit registration information when it is first plugged in or installed. The registration information and any other information can be transmitted to or from the meter 106 from the appliance 204 via one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3 G, etc.), RS232, USB, Firewire, Ethernet, wireless USB, cellular, OpenHAN, power line carrier (PLC), broadband over power lines (BPL), and the like. In one aspect, this registration process can occur automatically. In one aspect, the information can include a unique identifier for the appliance 204. For example, in one instance the unique appliance identifier can be an address on the first network 202 that uniquely identifies the appliance 204. Other identifiers can be, for example, the serial number of the appliance 204, or the serial number in combination with the model number of the appliance 204. In one aspect, the meter 106 can transmit at least a portion of the registration information to the second computing device 108 via the second network 110. For example, in one instance, the meter 106 can transmit the unique appliance identifier to the second computing device 108 via the second network 110. Furthermore, in one aspect the meter 106 can also transmit a smart meter identifier that uniquely identifies the meter 106 to the second computing device 108 connected to the second network 110. For example, in one aspect, the smart meter identifier that uniquely identifies the meter 106 can be a network address (e.g., IP address, MAC address, etc.) of the meter 106 on the second network 110. The registration information or the smart meter identifier that uniquely identifies the meter 106 and any other information can be transmitted to or from the second computing device 108 from the meter 106 via one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3 G, etc.), RS232, USB, Firewire, Ethernet, wireless USB, cellular, OpenHAN, power line carrier (PLC), broadband over power lines (BPL), and the like. In one aspect, the second network 110 comprises at least a portion of a smart grid network.

In one aspect, the second computing device 108 can receive update information for the appliance 204. For example, in one instance the update information can include a software update or a firmware update. In one instance, the update information can be electronically transmitted to the second computing device 108. For example, the second computing device 108 can be connected to the Internet and can electronically receive the update information. In one aspect, the update information can be transmitted to the second computing device from a manufacturer or vendor's computing device 206. In one aspect, the update information can include the unique identifiers of the appliances 204 that are to be updated. In one aspect, the second computing device 108 can maintain a table of unique appliance identifiers associated with the corresponding unique meter identifier for those appliances. Such a list is shown in FIG. 3. FIG. 3 illustrates an exemplary table that can be used to associate a unique meter identifier 302 with one or more unique device/appliance identifiers 304 of appliances 204 that are operably connected with the identified smart meter 106 via the first network 202. Using such a list, the second computing device 108 can transmit the update information only to the smart meters 106 that are associated with the appliances 204 that are to be updated. Therefore, in one instance the second computing device 108 transmits the update information to the smart meter 106 via the second network 110 using the unique identifier for the device 204 and the smart meter identifier. Once the update information is received by the smart meter 106 from the second computing device 108 over the second network 110, in one instance the smart meter 106 transmits the update information to the appliance using the first network 202. Once received by the appliance 204, the appliance 204 is updated by the update information. For example, in one instance the software of the appliance 204 can be updated by the update information.

In another aspect, diagnostic information such as for example, the need for a filter change of a water filter in a refrigerator, a compressor drawings excessive amps, high temperature of a motor, etc, can be transmitted from a smart appliance 204 to a smart meter 106 via a first network, and from the smart meter 106 to a second computing device 108 via a second network 110. In one aspect, the update information may correct problems identified by the diagnostic information. In another aspect, a repairperson may be dispatched based upon the diagnostic information. This diagnostic information can be used by vendors and manufacturers to monitor the status, operational characteristics and performance of the smart appliances.

In another aspect, software running on a remote server such as, for example, second computing device 108 can scan the smart appliances 204 via the smart meter 108 and smart grid infrastructure and register the appliance information such as for example the make, model, serial number, firmware/software version and network address. The software can also scans the manufacturer websites for latest appliance software/firmware updates and offers a consumer the opportunity of downloading these updates to the smart appliance.

Figure 4:
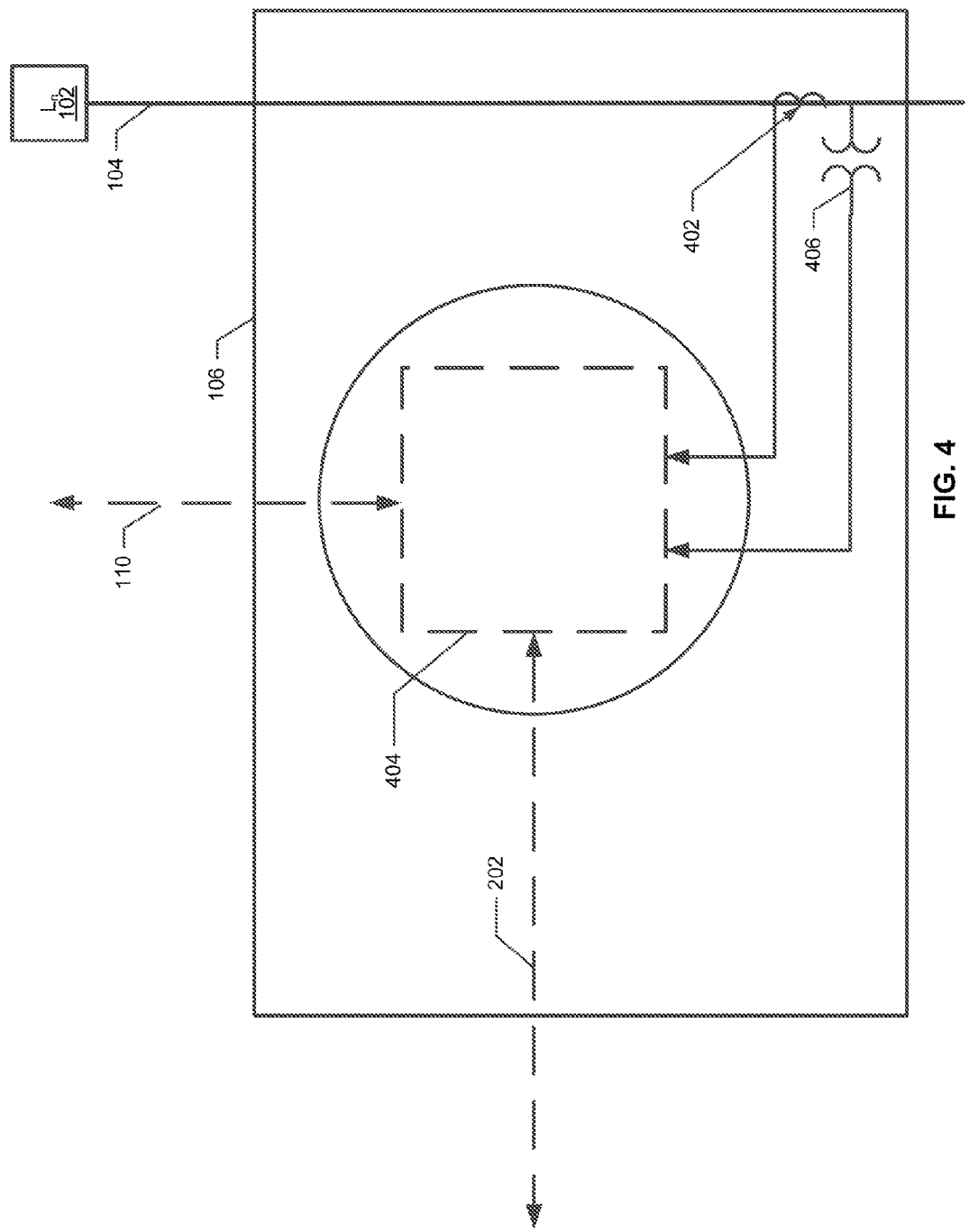
FIG. 4 illustrates an embodiment of a smart meter configured to communicate with smart appliances and devices over a first network and with a second computing device over a second network.

FIG. 4 illustrates an embodiment of a smart meter 106 configured to communicate with smart appliances and devices 204 over a first network 202 and with a second computing device 108 over a second network. Meter electronics 404 enable the smart meter 106 to communicate with the smart appliances 204 and the second computing device 108. In one aspect, the meter electronics 404 of the smart meter 106 receive via the first network 202, registration information for an appliance 204 operably connected to the first network 202. In one aspect, the registration information includes a unique identifier 304 for the appliance 204. The meter electronics 404 are configured to transmit via the second network 110, at least a portion of the registration information to a computing device 108 connected to the second network 110. The registration information comprises the unique identifier 304 for the appliance 204. Similarly, the meter electronics 404 can transmit appliance diagnostic information received via the first network 202 from the appliance 204 to the computing device 108 via the second network 110. The meter electronics 404 are further configured to receive, via the second network 110, update information for the appliance 204, wherein the update information is transmitted using the unique identifier 304 for the appliance 204. The meter electronics 404 are also configured to transmit, via the first network 202, the update information to the appliance 204. In one aspect, the computing device 108 scans the appliances 204 via the second network 110 and the first network 202 to determine if an appliance 204 is to be updated. Further comprising the smart meter 106 are one or more current transformers (CTs) 402 and one or more potential transformers (PTs) as may be required for metering, monitoring and power for the smart meter 106.

Figure 5:
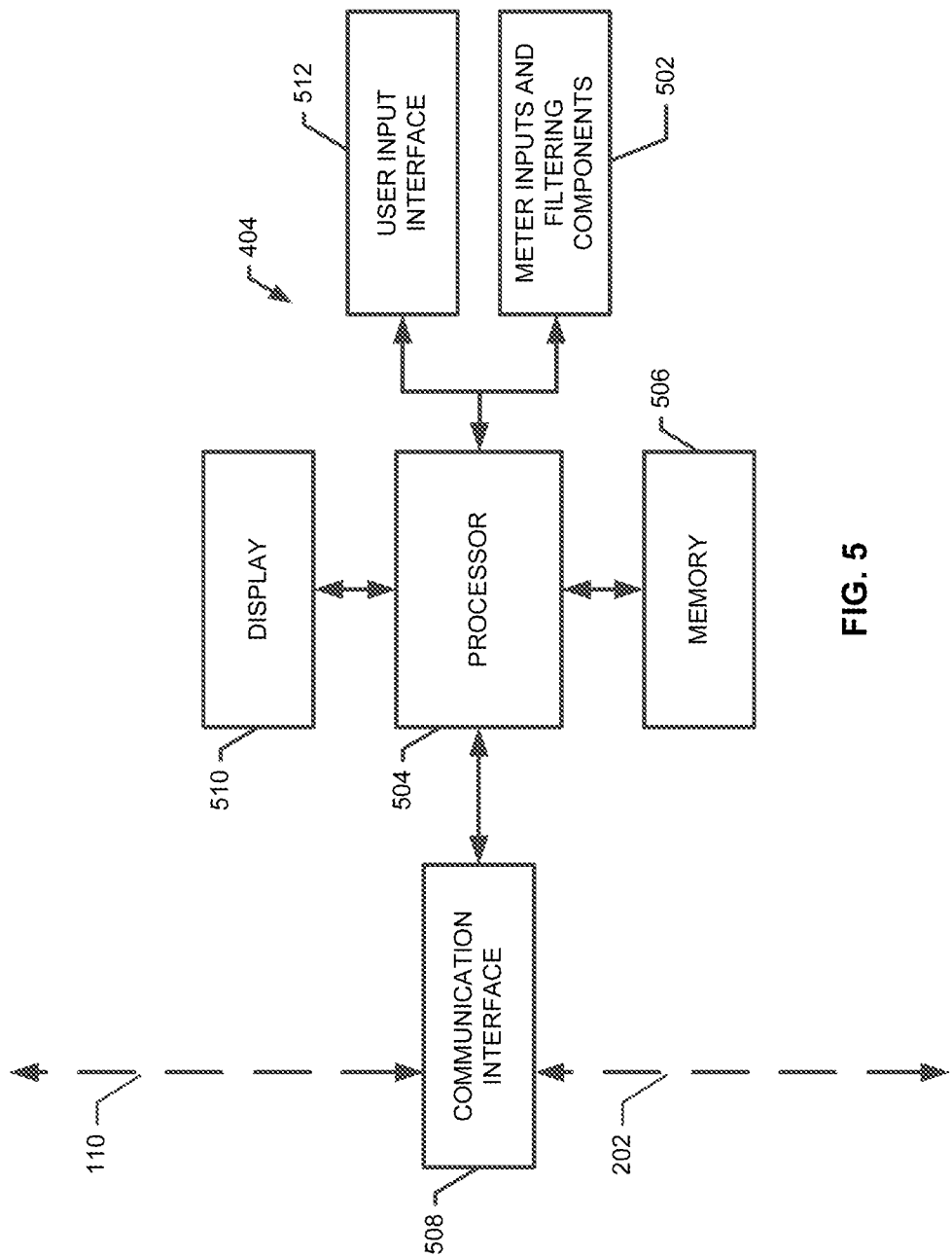
FIG. 5 illustrates a block diagram of an entity capable of operating as meter electronics in accordance with one embodiment of the present invention.

Referring now to FIG. 5, a block diagram of an entity capable of operating as meter electronics 404 is shown in accordance with one embodiment of the present invention. The entity capable of operating as meter electronics 404 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as meter electronics 404 can generally include means, such as one or more processors 504 for performing or controlling the various functions of the entity. As shown in FIG. 5, in one embodiment, meter electronics 404 can comprise meter inputs and filtering components 502. In one aspect, the meter inputs and filter components 402 can comprise, for example, voltage and current inputs, one or more ADCs, and filtering components. Further comprising this embodiment of meter electronics 404 is a processor 504 and memory 506. In one embodiment, the one or more processors 504 are in communication with or include memory 506, such as volatile and/or non-volatile memory that stores content, data or the like. For example, the memory 506 may store content transmitted from, and/or received by, the entity. For example, the memory may store registration, diagnostic and status information as received from an appliance 204. Similarly, the memory 506 may store update information as it is being transmitted to the appliance 204. Also, for example, the memory 506 may store software applications, instructions or the like for the processor to perform steps associated with operation of the entity in accordance with embodiments of the present invention. In particular, the one or more processors 504 may be configured to perform the processes discussed in more detail herein for updating software or firmware of an appliance 204 or reporting diagnostic information. For example, according to one embodiment the one or more processors 504 can be configured to transmit via the second network 110, at least a portion of the registration information to a computing device 108 connected to the second network 110. The registration information comprises the unique identifier 304 for the appliance 204. Similarly, the one or more processors 504 can transmit appliance diagnostic information received from the appliance 204 to the computing device 108 via the second network 110. The one or more processors 504 are further configured to receive, via the second network 110, update information for the appliance 204, wherein the update information is transmitted using the unique identifier 304 for the appliance 204. The one or more processors 504 are also configured to transmit, via the first network 202, the update information to the appliance 204.

In addition to the memory 506, the one or more processors 504 can also be connected to at least one interface or other means for displaying, transmitting and/or receiving data, content or the like. In this regard, the interface(s) can include at least one communication interface 508 or other means for transmitting and/or receiving data, content or the like, as well as at least one user interface that can include a display 510 and/or a user input interface 512. In one aspect, the communication interface 508 can be used to receive registration information from an appliance 204 via a first network 202, and to transfer at least a portion of the registration information to a second computing device 108 via a second network 110. In one aspect, the registration information can include a unique identifier for the appliance 204. Also, in one aspect, the communication interface 508 can be used to transfer a unique identifier for the meter 106 to the second computing device 108 via the second network 110. Furthermore, the communication interface 508 can be used to receive update information from the second computing device 108 via the second network 110, and to transfer the update information to the appliance 204 via the second network 202. The user input interface 512, in turn, can comprise any of a number of devices allowing the entity to receive data from a user, such as a keypad, a touch display, a joystick or other input device.

Figures 6, 7:
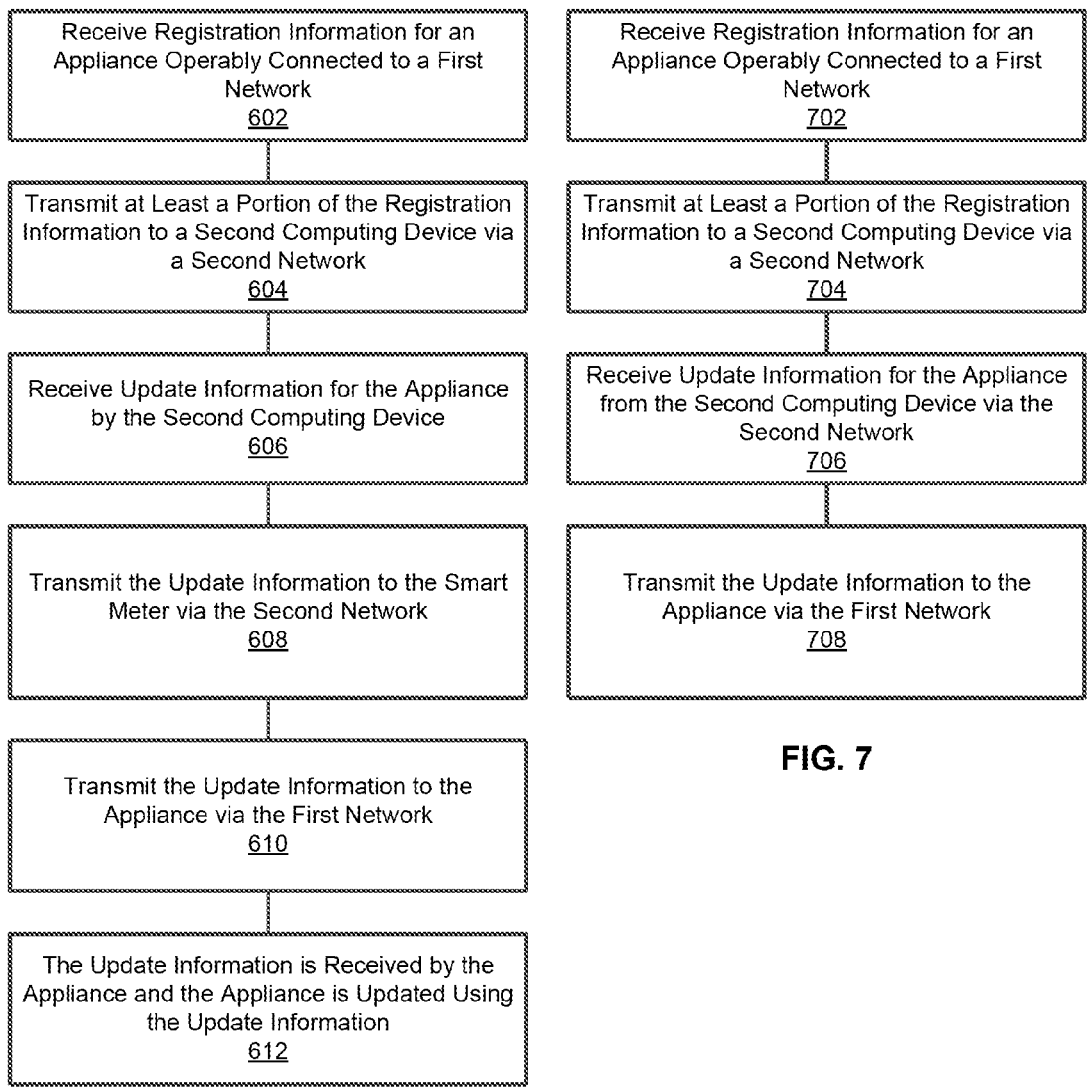
FIG. 6 is a flowchart illustrating the operations that may be taken for updating an appliance using a smart meter according to one embodiment of the present invention.
FIG. 7 is a flowchart illustrating steps that can be taken for updating an appliance using a smart meter according to another embodiment of the present invention.

Referring now to FIG. 6, the operations are illustrated that may be taken for updating an appliance using a smart meter. At step 602, a smart meter connected to a first network receives via the first network registration information for an appliance operably connected to the first network. In one aspect, the registration information includes a unique identifier for the appliance. At step 604, at least a portion of the registration information and a smart meter identifier that uniquely identifies the smart meter is transmitted from the smart meter to a second computing device connected to a second network. At step 606, the second computing device receives update information for the appliance. In one aspect, the update information can be directly loaded into the second computing device (e.g., typing, downloading from a memory device, etc.). In another aspect, the update information can be electronically transmitted from a vendor's computer to the second computing device. At step 608, the second computing device transmits the update information to the smart meter via the second network using the unique identifier for the device and the smart meter identifier. In one aspect, the update information is sent only to the smart meter associated with the device or devices that are to be updated. In one aspect, the second computing device scans the appliances via the second and first networks to determine devices that are to be updated. At step 610, the smart meter transmits the update information to the appliance via the first network. And, at step 612, the appliance receives and is updated with the update information.

FIG. 7 illustrates another aspect of steps that can be taken for updating an appliance using a smart meter. At step 702, registration information for an appliance operably connected to the first network is received via a first network. In one aspect, the registration information includes a unique identifier for the appliance. At step 704, at least a portion of the registration information is transmitted via a second network to a second computing device connected to the second network. In one aspect, the registration information comprises the unique identifier for the appliance. At step 706, update information for the device is received from the second computing device via the second network. In one aspect, the update information is transmitted using the unique identifier for the appliance. In other words, the address to transmit the update information is determined at least in part by the unique identifier for the appliance. At step 708, the update information is transmitted via the first network to the appliance.

Figures 8, 9:
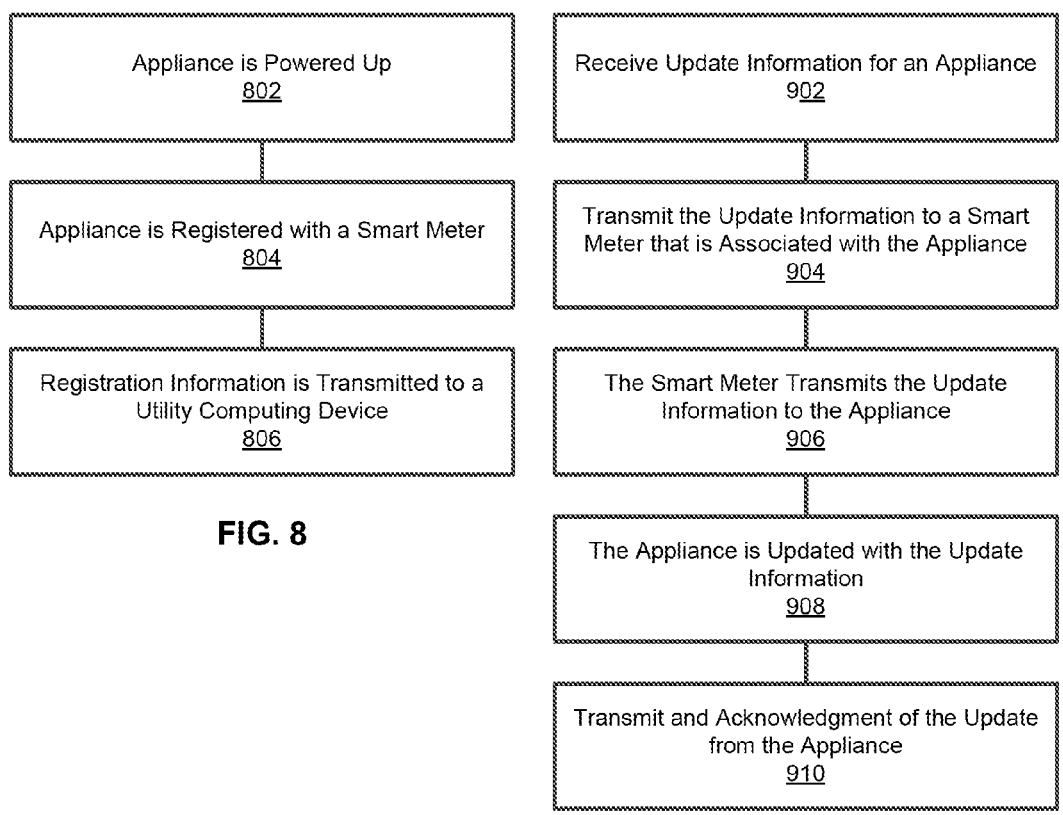
FIG. 8 is a flowchart illustrating the steps of an embodiment of a process for registering a smart appliance using a smart meter according to one embodiment of the present invention.
FIG. 9 is a flowchart illustrating the steps of an embodiment of a process for updating firmware or software or configuration settings of an appliance using a smart meter according to one embodiment of the present invention.

FIG. 8 illustrates the steps of an embodiment of a process for registering a smart appliance using a smart meter. At step 802, the appliance is first powered up. For example, in one instance this can comprise plugging the appliance in or otherwise connecting it with a power source. This step can cause activation of a registration module within the appliance. At step 804, the registration module of the appliance causes the appliance to register over a first network with a smart meter. In one aspect, this can comprise registering the appliance serial number and model number with the smart meter. In one aspect, the registration can include a unique identifier for the appliance, such as its network address on the first network. At step 806, the smart meter transmits at least a portion of the appliance registration information to a computing device associated with the utility service provider over a second network. In one aspect, this can comprise transmitting the appliance serial number and model number with the smart meter. In one aspect, the information transmitted to the utility service provider can include the unique identifier for the appliance, such as its network address on the first network. In one aspect, the information transmitted to the utility service provider can include a unique identifier for the smart meter, such as its network address on the second network.

FIG. 9 illustrates the steps of an embodiment of a process for updating firmware or software or configuration settings of an appliance using a smart meter. At step 902, update information for an appliance is received by a computing device associated with a utility service provider. For example, update information can be electronically or physically transmitted to the utility service provider and loaded onto the computing device of the utility service provider. As described herein, update information can include firmware updates, software updates, or new configuration settings for the appliance. At step 904, the utility computing device transmits the update information to a smart meter that is associated with the appliance to be updated. This update information is transmitted over a network. In one aspect, the network comprises at least a portion of a smart grid network. In one aspect, the update information includes a unique identifier for the smart meter associated with the appliance to be updated. In one aspect, the update information includes a unique identifier for the appliance to be updated. At step 906, the smart meter transmits the update information to the appliance to be updated. In one aspect, this update information is transmitted to the appliance via a network separate from the one used to transmit the update information to the smart meter. At step 908, the appliance is updated using the update information and an acknowledgment is transmitted to the smart meter. In one aspect, the acknowledgement includes a unique identifier for the appliance and a status of the update (e.g., successful, unsuccessful, etc.). At step 910, the acknowledgement is transmitted to the utility computing device where it is made available to the appliance vendor or manufacturer.

Figure 10:
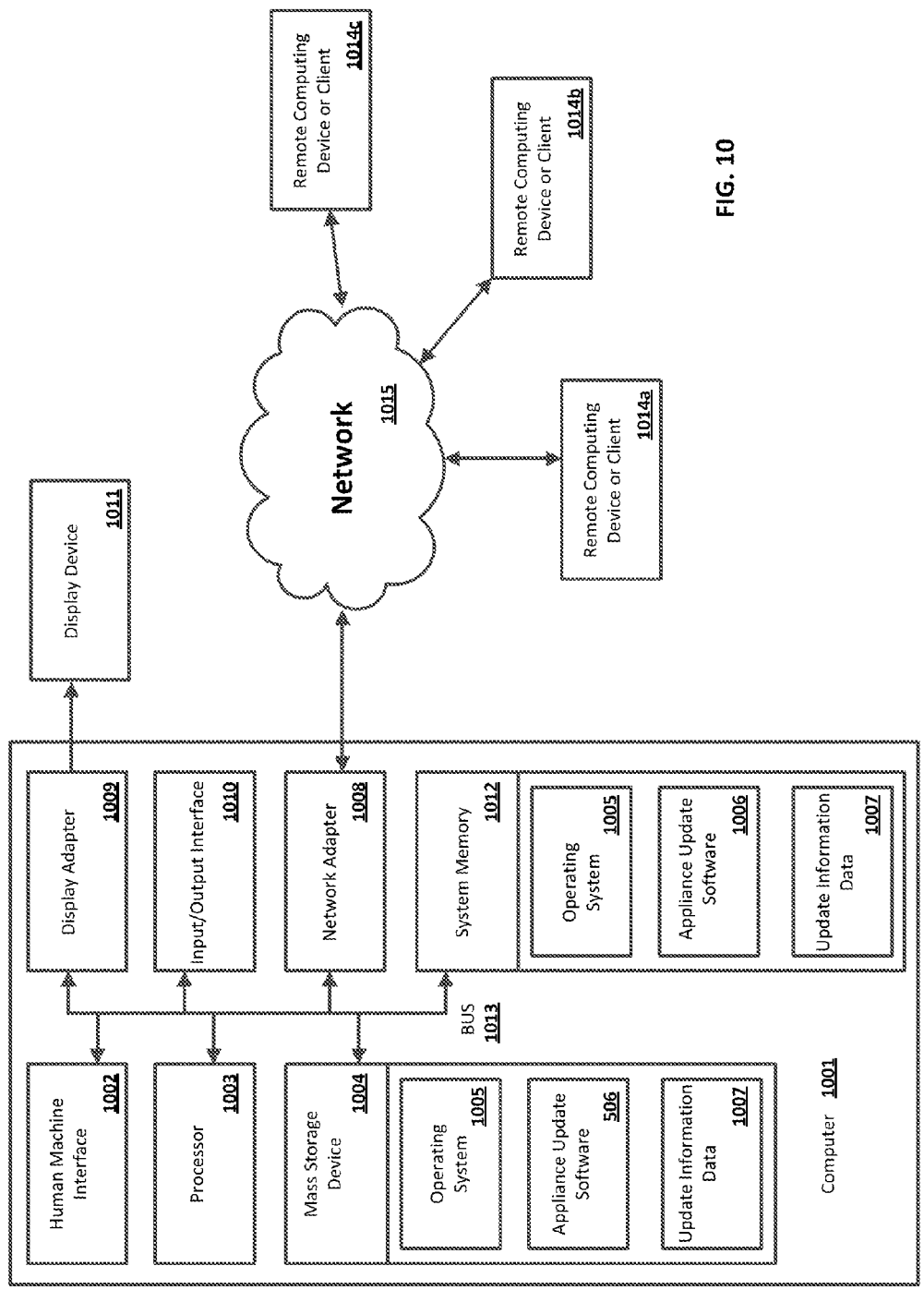
FIG. 10 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit, such as a smart appliance, a smart meter, a smart grid, a utility computing device, a vendor or manufacturer's computing device, etc., can be software, hardware, or a combination of software and hardware. The units can comprise the appliance update software 1006 as illustrated in FIG. 10 and described below. In one exemplary aspect, the units can comprise a computer 1001 as illustrated in FIG. 10 and described below.

FIG. 10 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1001. The components of the computer 1001 can comprise, but are not limited to, one or more processors or processing units 1003, a system memory 1012, and a system bus 1013 that couples various system components including the processor 1003 to the system memory 1012. In the case of multiple processing units 1003, the system can utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description can also be implemented over a wired or wireless network connection and each of the subsystems, including the processor 1003, a mass storage device 1004, an operating system 1005, appliance update software 1006, update information data 1007, a network adapter 1008, system memory 1012, an Input/Output Interface 1010, a display adapter 1009, a display device 1011, and a human machine interface 1002, can be contained within one or more remote computing devices or clients 1014a,b,c at physically separate locations, connected through buses of this form, in effect implementing a fully distributed system or distributed architecture.

The computer 1001 typically comprises a variety of computer readable media. Exemplary readable media can be any available media that is non-transitory and accessible by the computer 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as update information data 1007 and/or program modules such as operating system 1005 and appliance update software 1006 that are immediately accessible to and/or are presently operated on by the processing unit 1003.

In another aspect, the computer 1001 can also comprise other non-transitory, removable/non-removable, volatile/non-volatile computer storage media. By way of example, FIG. 10 illustrates a mass storage device 1004 that can provide non-volatile storage of computer code, computer readable instructions, data structures, program modules, and other data for the computer 1001. For example and not meant to be limiting, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, an operating system 1005 and appliance update software 1006. Each of the operating system 1005 and service registry software 1006 (or some combination thereof) can comprise elements of the programming and the appliance update 1006. Update information data 1007 can also be stored on the mass storage device 1004. Update information data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1003 via a human machine interface 1002 that is coupled to the system bus 1013, but can be connected by other interface and bus structures, such as a parallel port, game port, an IEEE 1394 Port (also known as a Firewire port), a serial port, or a universal serial bus (USB).

In yet another aspect, a display device 1011 can also be connected to the system bus 1013 via an interface, such as a display adapter 1009. It is contemplated that the computer 1001 can have more than one display adapter 1009 and the computer 1001 can have more than one display device 1011. For example, a display device can be a monitor, an LCD (Liquid Crystal Display), or a projector. In addition to the display device 1011, other output peripheral devices can comprise components such as speakers (not shown) and a printer (not shown), which can be connected to the computer 1001 via Input/Output Interface 1010. Any step and/or result of the methods can be output in any form to an output device. Such output can be any form of visual representation, including, but not limited to, textual, graphical, animation, audio, tactile, and the like.

The computer 1001 can operate in a networked environment using logical connections to one or more remote computing devices or clients 1014a,b,c. By way of example, a remote computing device 1014 can be a personal computer, portable computer, a server, a router, a network computer, a smart meter, a vendor or manufacture's computing device, smart grid components, a peer device or other common network node, and so on. Logical connections between the computer 1001 and a remote computing device or client 1014a,b,c can be made via a local area network (LAN) and a general wide area network (WAN). Such network connections can be through a network adapter 1008. A network adapter 1008 can be implemented in both wired and wireless environments. Such networking environments are conventional and commonplace in offices, enterprise-wide computer networks, intranets, and other networks 1015 such as the Internet.

For purposes of illustration, application programs and other executable program components such as the operating system 1005 are illustrated herein as discrete blocks, although it is recognized that such programs and components reside at various times in different storage components of the computing device 1001, and are executed by the data processor(s) of the computer. An implementation of appliance update software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 504 discussed above with reference to FIG. 5, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 504 of FIG. 5) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving via a first network, by a smart meter connected to the first network and connected to a second network, registration information for a device operably connected to said first network, wherein said registration information includes a unique identifier for said device, wherein the unique identifier for said device comprises a network address on the first network for the device and the smart meter comprises circuitry to measure utility consumption by the device;

transmitting via a second network, by the smart meter connected to the first network and the second network, at least the registration information for the device and a meter identifier that uniquely identifies the smart meter to a second computing device connected to the second network, wherein the meter identifier comprises a network address on the second network for the smart meter;

receiving, by said second computing device, the registration information for the device and the meter identifier;

receiving via a third network, by said second computing device, update information for the device, wherein the update information comprises a software or a firmware update for the device;

transmitting, by the second computing device, the update information to the smart meter via the second network using the registration information and the meter identifier;

transmitting, by the smart meter, the update information to the device; and updating the device with the update information.

2. The method of claim 1, wherein receiving via a first network, by a smart meter connected to the first network, registration information for a device operably connected to said first network comprises receiving the registration information via one or more of a WPAN, LAN/WLAN, WMAN, WAN/WWAN, RS232, USB, Firewire, Ethernet, wireless USB, cellular, OpenHAN, power line carrier (PLC), and broadband over power lines (BPL).

3. The method of claim 1, wherein transmitting via a second network, by the smart meter connected to the second network, at least the registration information and a meter identifier that uniquely identifies the smart meter to a second computing device connected to the second network comprises transmitting the at least a portion of the registration information and the meter identifier that uniquely identifies the smart meter to the second computing device via a smart-grid network.

4. The method of claim 3, wherein the smart-grid network comprises one or more of a WPAN, LAN/WLAN, WMAN, WAN/WWAN, RS232, USB, Firewire, Ethernet, wireless USB, cellular, OpenHAN, power line carrier (PLC), and broadband over power lines (BPL).

5. The method of claim 1, wherein the device operably connected to said first network comprises a plurality of devices operably connected to the first network.

6. The method of claim 5, wherein transmitting, by the second computing device, the update information to the smart meter via the second network using the registration information for the device and the meter identifier comprises determining by the second computing device the device from among the plurality of devices operably connected to the first network.

7. The method of claim 6, wherein determining by the second computing device the device from among the plurality of devices operably connected to the first network comprises automatically scanning the first and second networks for devices to be updated.

8. The method of claim 1, wherein transmitting via a second network, by the smart meter connected to the second network, at least the registration information and a meter identifier that uniquely identifies the smart meter to a second computing device connected to the second network comprises transmitting at least a portion of the registration information and the meter identifier that uniquely identifies the smart meter to a utility service provider's computing device.

9. A system comprised of:
a first network;
a smart meter operably connected to the first network, wherein the smart meter receives via the first network, registration information for a device operably connected to said first network, said registration information including a unique identifier for said device, wherein the unique identifier for said device comprises a network address on the first network for the device and the smart meter comprises circuitry to measure utility consumption by the device;
a second network operably connected with the smart meter;
a second computing device operably connected with the second network and a third network, wherein the smart meter transmits via the second network, at least the registration information and a meter identifier that uniquely identifies the smart meter to the second computing device connected to the second network, wherein the meter identifier comprises a network address on the second network for the smart meter,
wherein the second computing device receives the registration information and the meter identifier,
wherein the second computing device receives update information for the device via the third network,
wherein the update information comprises a software or a firmware update for the device,
wherein the second computing device transmits the update information to the smart meter via the second network using the registration information and the meter identifier,
wherein the smart meter transmits the update information to the device, and
wherein the device is updated with the update information.

10. The system of claim 9, wherein the second network comprises a smart grid network.

11. A method comprising:
receiving via a first network, by a smart meter connected to the first network and connected to a second network, registration information for an appliance operably connected to said first network, wherein said registration information includes a unique identifier for said appliance, wherein the unique identifier for said device comprises a network address on the first network for the device and the smart meter comprises circuitry to measure utility consumption by the appliance;
transmitting via a second network, by a smart meter connected to the second network, registration information for an appliance connected to the smart meter via the first network and a smart meter identifier that uniquely identifies the smart meter, to a second computing device connected to the second network, wherein the meter identifier comprises a network address on the second network for the smart meter and said second network is comprised of a plurality of smart meters, each of the plurality of smart meters connected to a respective first network and to the second network, and each respective first network connected to one or more appliances;
receiving, by said second computing device, said registration information and the smart meter identifier and storing said registration information and smart meter identifier with registration information and smart meter identifiers for the plurality of smart meters and their respective one or more appliances to form a plurality of smart meter identifiers each associated with one or more registration information;
receiving via a third network, by said second computing device, update information for at least one of the one or more appliances, wherein the update information comprises a software or a firmware update for the appliance;
determining, by the second computing device, by comparing the update information to each of the one or more registration information for each smart meter identifier, a selected smart meter identifier to receive the update information;
transmitting, by the second computing device, the update information to the a selected smart meter associated with the selected smart meter identifier;
transmitting, by the selected smart meter, the update information to the appliance; and
updating the appliance with the update information.

* * * * *